United States Patent
Rohde

(10) Patent No.: US 8,997,779 B2
(45) Date of Patent: Apr. 7, 2015

(54) VALVE LOCKOUT DEVICE

(71) Applicant: Brady Worldwide, Inc., Milwaukee, WI (US)

(72) Inventor: Christopher J. Rohde, West Allis, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 99 days.

(21) Appl. No.: 13/724,392

(22) Filed: Dec. 21, 2012

(65) Prior Publication Data

US 2013/0160870 A1    Jun. 27, 2013

Related U.S. Application Data

(60) Provisional application No. 61/579,584, filed on Dec. 22, 2011.

(51) Int. Cl.
*F16K 35/10* (2006.01)
*F16K 35/06* (2006.01)

(52) U.S. Cl.
CPC ..................................... *F16K 35/06* (2013.01)

(58) Field of Classification Search
CPC .......... F16K 35/06; F16K 35/10; F16K 35/12

USPC ............ 137/383, 385; 70/175, 176, 177, 178, 70/179, 180

See application file for complete search history.

(56) References Cited

U.S. PATENT DOCUMENTS

| | | | | |
|---|---|---|---|---|
| 3,980,099 A | * | 9/1976 | Youngblood | 137/382 |
| 4,208,893 A | * | 6/1980 | Avrich et al. | 70/178 |
| 5,165,263 A | * | 11/1992 | Perron et al. | 70/177 |
| 5,427,135 A | * | 6/1995 | Kieper | 137/385 |
| 5,598,724 A | * | 2/1997 | Primeau | 70/177 |
| 5,806,555 A | * | 9/1998 | Magno, Jr. | 137/385 |
| 6,622,536 B1 | * | 9/2003 | Fuller et al. | 70/177 |
| 7,581,420 B2 | * | 9/2009 | Manthe et al. | 70/178 |
| 7,588,050 B1 | * | 9/2009 | Russell | 137/384 |
| 2010/0108921 A1 | * | 5/2010 | Milbeck et al. | 251/90 |

* cited by examiner

*Primary Examiner* — Kevin Murphy
(74) *Attorney, Agent, or Firm* — Quarles & Brady LLP

(57) ABSTRACT

A lockout device that can be used to lock a valve in a closed position, for use particularly with valves that include a stationary member, such as a body, and a rotating member, such as a handle or wheel, for activating and deactivating the valve is disclosed. The lockout device can also be used to provide a connection point for connecting various types of connectors to a hose clamp or other elongate connecting member mounted on and locked onto a body such as a pipe or valve.

20 Claims, 5 Drawing Sheets

VALVE LOCKOUT DEVICE

CROSS-REFERENCE TO RELATED APPLICATIONS

This application claims the benefit of U.S. Provisional patent application Ser. No. 61/579,584 filed on Dec. 22, 2011, entitled "Valve Lockout Device".

BACKGROUND OF THE INVENTION

The present invention comprises a lockout device that can be used to lock a valve in a closed position, for use particularly with valves that include a stationary member.

Valve lockout devices are used to prevent changing the state of a valve, such as between a closed position and an opened position. For instance, a valve lockout device may be used to lock a valve in a fully closed position while a technician performs repair or maintenance on a component (e.g., a turbine) that is downstream of the locked-out valve. The valve lockout device provides a visual and a structural impediment to altering the state of the valve by, for instance, blocking access to the control handle of a valve or structurally restricting the physical movement of the control handle.

Designing a robust valve lockout device is challenging when the valve lockout device is required to alternately engage and effectively lockout more than one size and/or type of valve. For example, there are typically different design considerations for a ball valve having a rectangular handle as compared to butterfly valve having a circular handwheel. A single valve lockout device, moreover, is typically used in these different situations, and a single valve lockout device is unlikely to provide an adequate solution to such unique styles of valves. The present invention addresses these and other issues.

SUMMARY OF THE INVENTION

The present invention comprises a lockout device that can be used to lock a valve in a closed position, for use particularly with valves that include a stationary member, such as a body, and a rotating member, such as a handle or wheel, for activating and deactivating the valve. The present invention can also be used to provide a connection point for connecting various types of connectors to a hose clamp or other elongate connecting member mounted on and locked onto a body such as a pipe or valve.

To apply the lockout device, the valve body or other stationary member receives a commercially-available device such as a hose clamp or other elongate locking member that includes a belt or band of material that can be extended around the body of the valve or a connecting pipe, and a coupling device, such as a worm gear or other element that locks the opposing ends of the belt or band together. The hose clamp is retained in position by the lockout device which includes a corresponding cover to prevent access to the coupling element, and an aperture for receiving a cable or shackle of a padlock. The rotating member receives a bracket or other mechanical member that also includes an aperture to receive the cable or shackle. The cable or shackle extends between the mechanical member and the lockout device to prevent rotation of the rotating member to activate the valve, while the lockout device prevents removal of the hose clamp. Examples of valves that can be used with these lockout configurations include butterfly valves, gate valves and other types of known valves. In one application, described below, the lockout device can be used advantageously to lock the handle of a ball valve in position, and to prevent accidental opening of the valve. The lockout device can also be advantageously used with a commercially-available device, such as a hose clamp.

In one aspect, the invention comprises a lockout device including a lockout body, a shackle holder, and a lockout cover. The lockout body includes an outer surface defining an internal opening sized and dimensioned to receive a coupling element of a clamp to be received on a stationary portion of a valve. The shackle holder extends from the outer surface of the valve lockout body and includes a shackle holder aperture sized and dimensioned to receive a valve lockout coupling element. The lockout cover is adapted to be slidably received on the lockout body, the lockout cover in includes a body adapted to enclose at least a portion of the opening in the outer surface of the lockout body to limit access to the coupling element when received on the lockout body; a shackle receiving cover sized and dimensioned to be slidably received on the shackle holder of the lockout body, the shackle receiving cover including a shackle cover aperture positioned to align with the shackle holder aperture when the lockout cover is received on the lockout body, and to receive the valve lockout coupling element; and a bracket sized and dimensioned for receipt on a rotating element of the valve. The bracket comprises a bracket shackle aperture sized and dimensioned to receive the valve lockout coupling element, wherein when the lockout body is coupled to the stationary portion of the valve, and the lockout cover is received on the lockout body to limit access to the coupling element of the clamp, the valve lockout coupling element is received through the shackle holder aperture in the lockout body, the shackle cover aperture in the lockout cover, and the bracket shackle aperture in the bracket, the rotating element of the valve is prevented from rotating to open the valve.

In another aspect, the invention comprises a lockout and mounting device comprising a lockout body and a lockout cover. The lockout body includes an outer surface defining an internal opening sized and dimensioned to receive a coupling element of a clamp to be received on a stationary portion of a valve, and a shackle holder extending from the outer surface of the valve lockout body and including a shackle holder aperture sized and dimensioned to receive a lockout coupling element. The lockout cover is adapted to be slidably received on the lockout body, and includes a body adapted to enclose at least a portion of the opening in the outer surface of the lockout body to limit access to the coupling element when received on the lockout body, and a shackle receiving cover sized and dimensioned to be slidably received on the shackle holder of the lockout body. The shackle receiving cover includes a shackle cover aperture positioned to align with the shackle holder aperture when the lockout cover is received on the lockout body, and to receive the lockout coupling element. amounting is member coupled to at least one of the body and the shackle holder. When the lockout body is coupled to a hose clamp positioned on a mechanical member, and the lockout cover is received on the lockout body to limit access to the coupling element of the clamp, the lockout coupling element is received through the shackle holder aperture in the lockout body and the shackle cover aperture in the lockout cover to prevent access to the clamp, such that the mounting member comprises an access point allowing a user to selectively attach elements to the lockout and mounting device.

DETAILED DESCRIPTION OF THE PREFERRED EMBODIMENT

Figure 1:
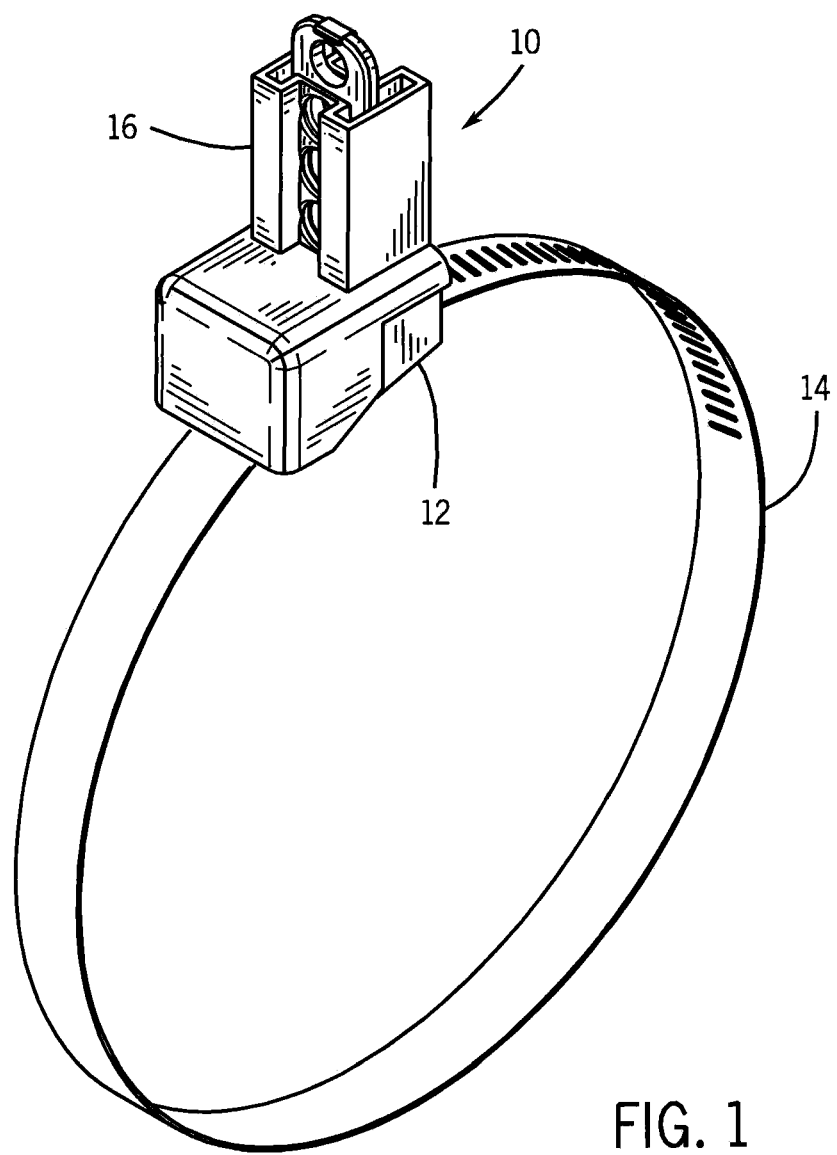
FIG. 1 is a perspective view of a valve lockout device constructed in accordance with aspects of the disclosure, shown on a hose clamp and in a closed position.
Figure 7:
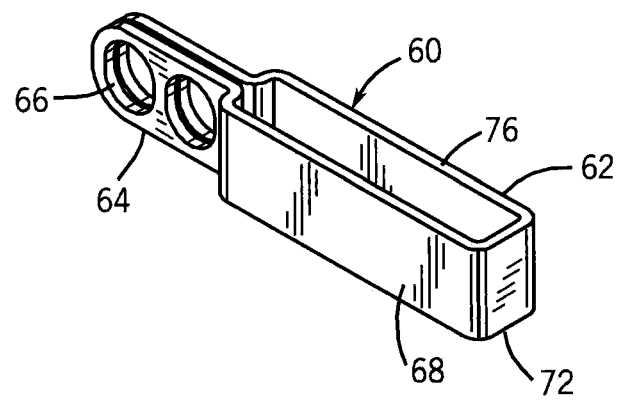
FIG. 7 is perspective view of a valve handle bracket including a handle receiving portion and shackle receiving portion.

Referring now to the figures, and more particularly to FIGS. 1 and 7, the lockout device 10 comprises a lockout body 12 and lockout cover 16 which are received on the hose clamp. For use with a ball valve, a valve handle bracket 60 (FIG. 7) is received on a handle of the valve to be locked. Each of the lockout body, lockout cover 14, and valve handle bracket 60 include apertures for receiving a padlock shackle to limit motion of the valve handle and prevent access to the hose clamp, as described more fully below.

Figure 2:
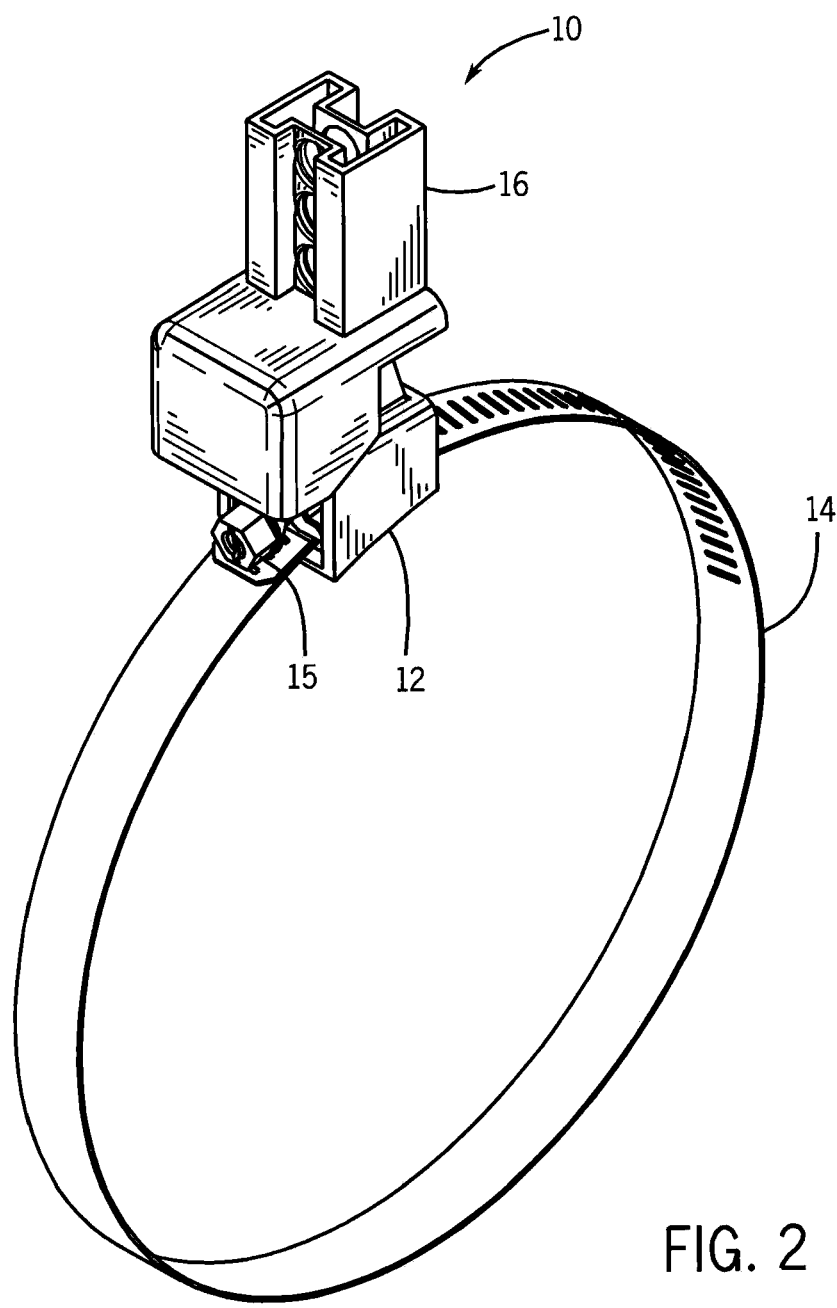
FIG. 2 is a perspective view of the valve lockout device of FIG. 1 in an open position.

Referring again to the figures and more particularly to FIGS. 1 and 2, a valve lockout device 10 constructed in accordance with the present invention is shown coupled to a commercially available hose clamp 14 as shown. The hose clamp 14 is sized and dimensioned to be received around the surface of a ball valve or other valve. The valve lockout device 10 comprises a lockout body 12 including an interior opening that receives the hose clamp 14 and a lockout cover 16 that can be received over the lockout body 12 to enclose the end of the interior opening and to limit access to a coupling device 15, such as a threaded bolt, that maintains the hose clamp 14 in position on the valve body in use, as described more fully below. The lockout body 12 and corresponding lockout cover 16 include corresponding shackle apertures which, when aligned, are sized and dimensioned to receive the shackle of a padlock. The padlock maintains the lockout cover 16 over the lockout body 12 and limits access to the coupling device 15 of the hose clamp 14, also as described more fully below.

Figure 3:
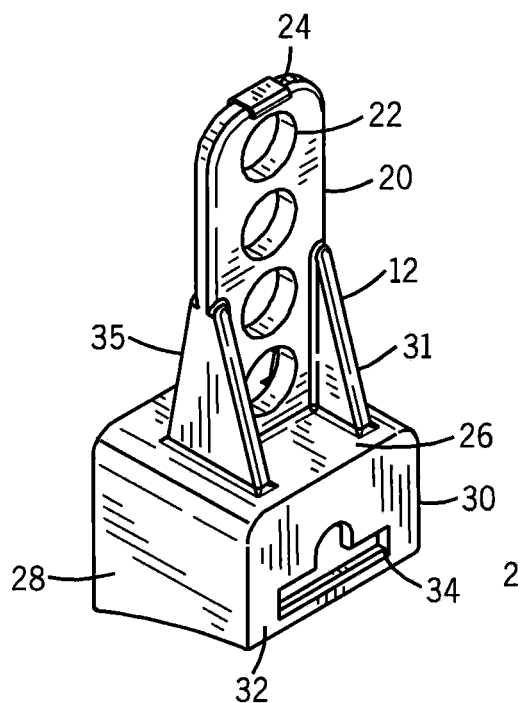
FIG. 3 is a perspective view of the lockout body 12 a first end of the body.
Figure 4:
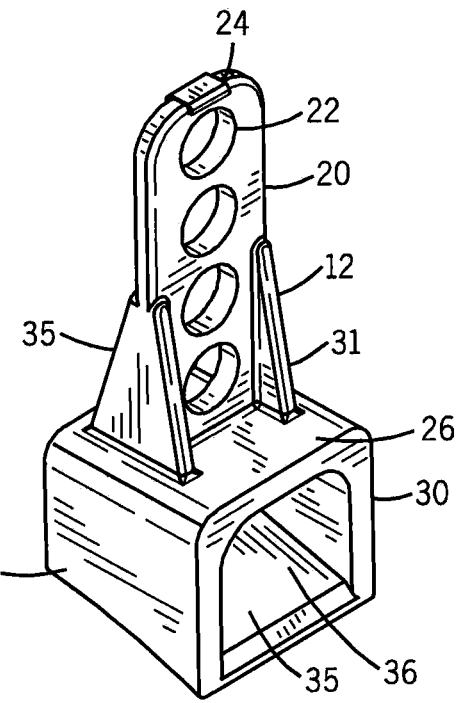
FIG. 4 is a perspective view of the lockout body from an opposing ends as compared to FIG. 3.

Referring now to FIGS. 3 and 4, perspective views of the lockout body 12 from opposing ends of the body 12 are shown. Referring first to FIG. 3, the lockout body 12 comprises an upper surface 26, opposing side surfaces 28 and 30, and an end surface 32 extending between the opposing side surfaces 28 and 30 to substantially enclose one end of the body, and including a clamp aperture 34 sized and dimensioned to receive the belt portion of the hose clamp 14. As shown here, the upper surface 26, side surfaces 28 and 30, and clamp aperture 34 form a substantially rectangular, box-shaped element, although rounded, circular, polygonal, or other types of configurations could also be used.

Referring now to FIG. 4, the lockout body 12 further includes a lower surface 35 opposite the upper surface 26 and connected to the upper surface 26 by opposing side surfaces 28 and 30. The end of the lockout body 12 opposite end surface 32 is open, providing access to an opening 36 for receiving the coupling device 15 of the hose clamp 14.

Referring still to FIGS. 3 and 4, a shackle holder 20 extends upwardly from the upper surface 26 of the lockout body 12 and includes one or more shackle aperture 22 for receiving the shackle of a padlock in use. A pair of stabilizer legs 31 and 33 couple the shackle holder 20 to the upper surface 26 of the lockout body 12 to provide a stable surface for receiving the padlock. The lockout body 12 is typically constructed of a durable, heat resistant material, such as metal, and includes a clip 24 provided at the distal end of the shackle holder 20 for coupling the lockout cover 16 in position when the cover 16 is positioned over the lockout body 12, as described below.

Figure 5:
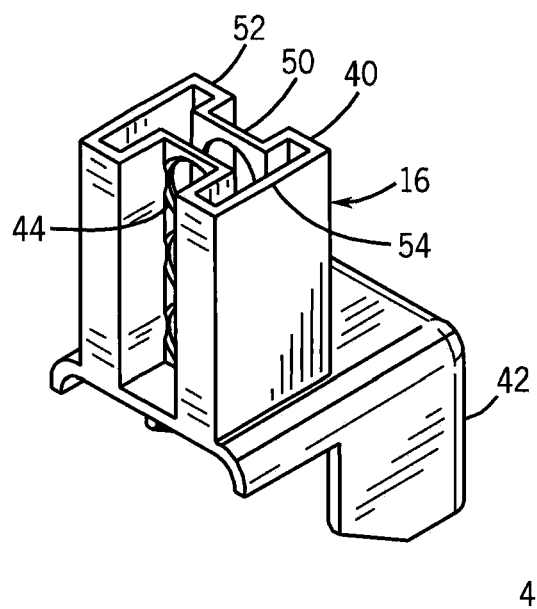
FIG. 5 is a perspective views of the lockout cover from a first end.
Figure 6:
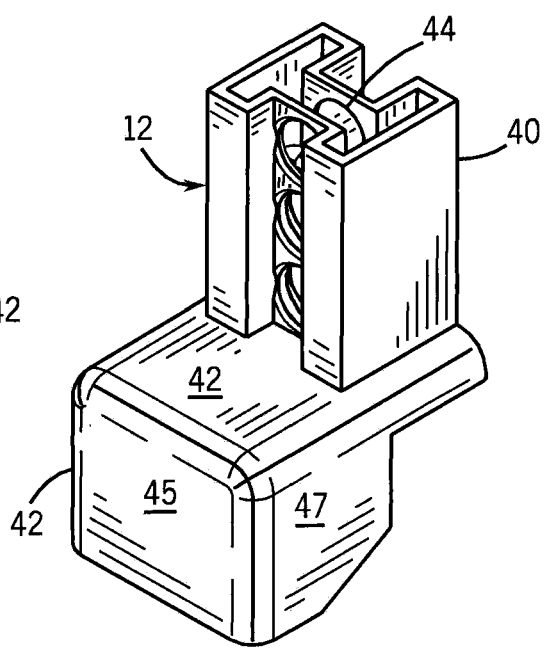
FIG. 6 is a perspective view of the lockout body from an opposing ends as compared to FIG. 5.

Referring now to FIGS. 5 and 6, front and rear perspective views of the lockout cover 16 are shown. The lockout cover 16 includes a body portion 42 having an upper surface 43, end surface 45, and opposing side surfaces 47. A shackle cover 40 extends upwardly from the upper surface 43 of the body portion 42 and includes at least one shackle aperture 44 that is sized and dimensioned to receive a padlock shackle when aligned with the shackle aperture 22 in the lockout body 12. As shown here, the shackle holder cover 40 can comprise an I-shaped element including an elongate center section 50 including shackle apertures 44 and two outer stabilizer sections 52 and 54 which are sized and dimensioned to be slideably received on the stabilizer legs 31 and 33 of the lockout body 12. The center section 50 is comparatively narrower and sized and dimensioned to be received over the shackle holder 20, while the outer stabilizer sections 52 and 54 are slideably received over the leg stabilizers 31 and 33 as described more fully below.

Referring again to FIG. 2, in use, the lockout body 12 receives one end of the belt, band, or strap of a hose clamp 14 or similar device, such as a cable tie, through the clamp aperture 34 in the end surface 32, along with the coupling element 15 for locking the hose clamp 14 in position. The coupling element 15, which can include, as shown here, a threaded bolt 15, is received within the valve lockout body 12, and is accessible through the opening 36 in the lockout body 12 when the lockout cover 16 is raised. When the lockout body 12 is positioned on the hose clamp 14, the lockout cover 16 is slid onto the shackle holder 20 such that the outer stabilizer sections 52 and 54 are received on the stabilizer legs 31 and 33. In position, the shackle apertures 44 in the center section 50 of the lockout cover 16 aligns with the shackle apertures 22 in the lockout body 12, and the end surface 45 of the lockout cover 16 covers the end of valve body 12 including opening 36, thereby preventing access to the coupling element 15 of hose clamp 14. As the lockout cover 16 is slid over the body 12, the clip 24 maintains the cover 16 in position.

Referring now to FIG. 7, a valve handle bracket 60 comprising a handle receiving portion 62 and shackle receiving portion 64 as shown. As shown here, the handle receiving portion comprises opposing sides 68 and 70 which are offset a distance to allow the valve handle bracket 60 to be received on a valve handle of a ball valve or other valve as described below. The opposing sides 68 and 70 are joined at one end by the shackle receiving portion 64 and at the opposing end by an end surface 72, the shackle receiving portion 64 comprises one or more shackle apertures 66 which, as discussed above, is sized and dimensioned to receive the shackle of a padlock for locking the valve in position.

Figure 8:
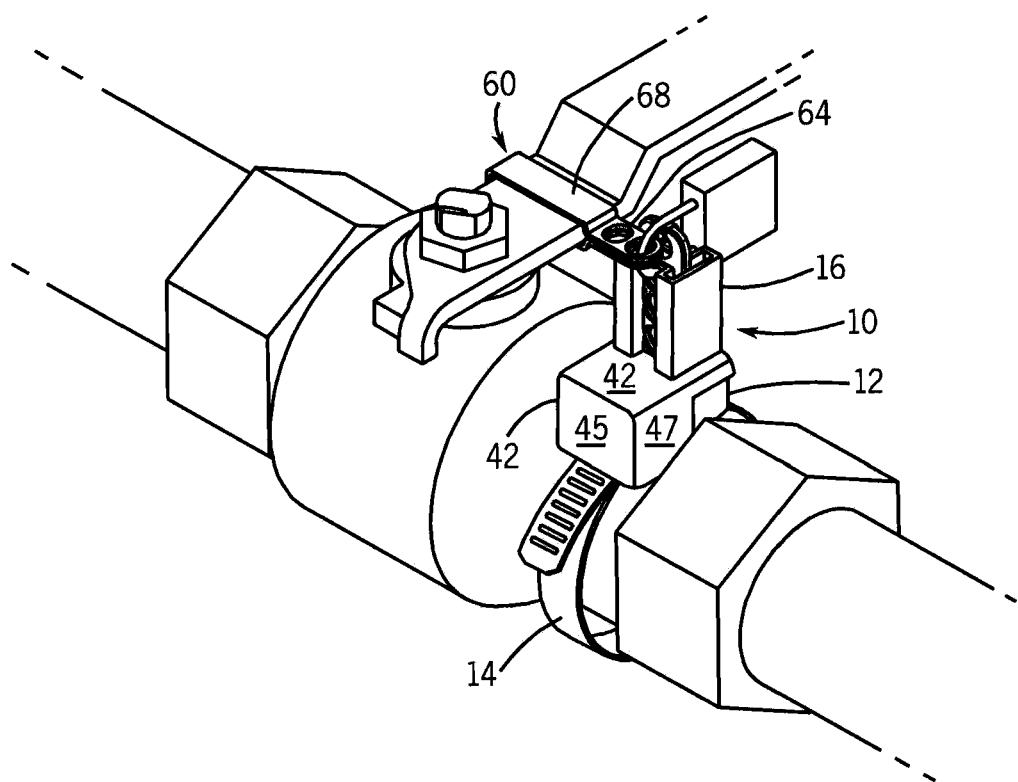
FIG. 8 is perspective view of the valve lockout device and hose clamp a valve such as a ball valve.

Referring now to FIG. 8, in operation, the hose clamp 14 is received on a connecting pipe or the valve body of a valve such as a ball valve, with the lockout body 12 received over the coupled end of the hose clamp 14. The lockout cover 16 is received over the lockout body 12 to limit access to the coupling element 15. The valve handle bracket 60 is received over the handle of the valve. When the valve is in a closed position, such that the valve handle is rotated to an off position, the shackle aperture 66 and the valve handle bracket 60 is positioned sufficiently close to the corresponding shackle apertures 22 and 44 aligned in the lockout body 12 and lockout cover 16 such that the shackle of a padlock can be received through each of the apertures 22, 44, and 66. When the padlock is received in the apertures, access to the coupling element 15 of the hose clamp 14 is prevented by the combination of the lockout cover 16 enclosing the opening 36 in the lockout body 12, which is locked into position by the padlock, and the padlock, which also limits motion of the valve handle to prevent opening the valve.

Figure 9:
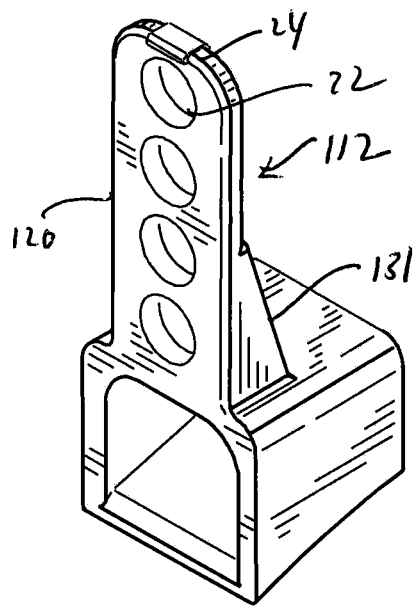
FIG. 9 is a perspective view of a body of an alternative valve lockout device constructed in accordance with aspects of the disclosure.
Figure 10:
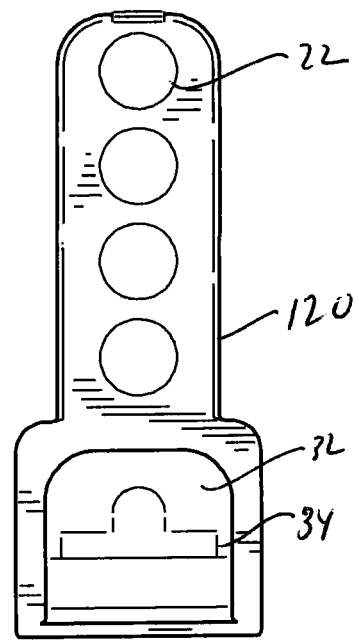
FIG. 10 is a side view of the body of FIG. 9.
Figure 11:
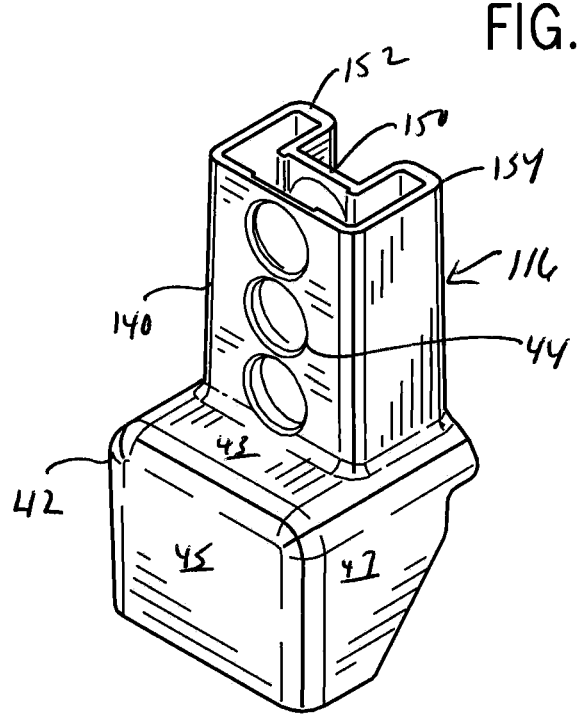
FIG. 11 is a perspective view of a lockout valve cover corresponding to the body of FIGS. 9 and 10.

Referring now to FIGS. 9 through 11, an alternate embodiment of a lockout body 112 and corresponding cover 116 is shown. Here, the shackle holder 120 extends upwardly from the upper surface 26 of the lockout body 12 and includes one or more shackle aperture 22 for receiving the shackle of a padlock in use. A pair of stabilizer legs 131 (opposing side not shown) again couple the shackle holder 120 to the upper surface 26 of the lockout body 112 to provide a stable surface for receiving the padlock. The corresponding lockout cover 116 includes a body portion 42 having an upper surface 43, end surface 45, and opposing side surfaces 47, as described above with reference to the first embodiment. A shackle cover 140 extends upwardly from the upper surface 43 of the body portion 42 and includes at least one shackle aperture 44 that is sized and dimensioned to receive a padlock shackle when aligned with the shackle aperture 22 in the lockout body 112. As shown here, the shackle holder cover 140 comprises a C-shaped element including an elongate center section 150 including shackle apertures 44 and two outer stabilizer sections 152 and 154 which are sized and dimensioned to be slidably received on the stabilizer legs 131 of the lockout body 112. The center section 150 is sized and dimensioned to be received over the shackle holder 120, while the outer stabilizer sections 152 and 154 are slidably received over the leg stabilizers 131 and 133 as described above with reference to the first embodiment.

Although the lockout bodies 12 and 112 and corresponding covers 16 and 116 are shown and described for use in locking out a valve, in other applications, these devices can also be used to lock a hose clamp 14 or similar device on a mechanical member, such as a pipe, which can then act as a mounting point. By providing various types of apertures and mating connecting elements on the shackle holder or other surfaces of the cover, the devices can be used as a connection point for connecting devices to a mechanical member, while maintaining the cable clamp 14 in position on the pipe. In one example, the connecting element can be a clip for coupling a safety sign to a pipe or other device. Other types of connecting elements will be apparent to those of ordinary skill in the art.

Although specific embodiments have been shown by way of example in the drawings and have been described in detail herein, it should be understood that the invention is not intended to be limited to the particular forms disclosed. Rather, the invention is to cover all modifications, equivalents, and alternatives falling within the spirit and scope of the invention as defined by the following claims.

I claim:

1. A lockout device comprising:
   a lockout body including:
   an outer surface defining an internal opening sized and dimensioned to receive a coupling element of a clamp to be received on a stationary portion of a valve, and
   a shackle holder extending from the outer surface of the valve lockout body and including a shackle holder aperture sized and dimensioned to receive a valve lockout coupling element;
   a lockout cover adapted to be slidably received on the lockout body, the lockout cover including:
   a body adapted to enclose at least a portion of the opening in the outer surface of the lockout body to limit access to the coupling element when received on the lockout body; and
   a shackle receiving cover sized and dimensioned to be slidably received on the shackle holder of the lockout body, the shackle receiving cover including a shackle cover aperture positioned to align with the shackle holder aperture when the lockout cover is received on the lockout body, and to receive the valve lockout coupling element; and
   a bracket sized and dimensioned for receipt on a rotating element of the valve, the bracket comprising a bracket shackle aperture sized and dimensioned to receive the valve lockout coupling element, wherein when the lockout body is coupled to the stationary portion of the valve, and the lockout cover is received on the lockout body to limit access to the coupling element of the clamp, the valve lockout coupling element is received through the shackle holder aperture in the lockout body, the shackle cover aperture in the lockout cover, and the bracket shackle aperture in the bracket, the rotating element of the valve is prevented from rotating to open the valve.

2. The lockout device of claim 1, wherein the valve lockout coupling element comprises a padlock with a shackle.

3. The lockout device of claim 1, wherein the clamp comprises a hose clamp.

4. The lockout device of claim 1, wherein the valve is a ball valve, and the rotating element is a handle.

5. The lockout device of claim 1, wherein the valve lockout coupling element comprises a cable.

6. The lockout device of claim 1, wherein the valve lockout coupling element comprises a cable tie.

7. A lockout device comprising:
   a lockout body including:
   an outer surface defining an internal opening sized and dimensioned to receive a coupling element of a clamp to be received on a stationary portion of a valve, and
   a shackle holder extending from the outer surface of the valve lockout body and including a shackle holder aperture sized and dimensioned to receive a valve lockout coupling element;
   a lockout cover adapted to be slidably received on the lockout body, the lockout cover including:
   a body adapted to enclose at least a portion of the opening in the outer surface of the lockout body to limit access to the coupling element when received on the lockout body; and
   a shackle receiving cover sized and dimensioned to be slidably received on the shackle holder of the lockout body, the shackle receiving cover including a shackle cover aperture positioned to align with the shackle holder aperture when the lockout cover is received on the lockout body, and to receive the valve lockout coupling element;
   a valve rotation limiting element sized and dimensioned for receipt on a rotating element of the valve, the valve rotation limitation element comprising a shackle aperture adapted to receive the valve lockout coupling element, wherein when the lockout body is coupled to the stationary portion of the valve, and the lockout cover is received on the lockout body to limit access to the coupling element of the clamp, the valve lockout coupling element is received through the shackle holder aperture in the lockout body, the shackle cover aperture in the lockout cover, and the shackle aperture in the valve rotation limiting element, the rotating element of the valve is prevented from rotating to open the valve.

8. The lockout device of claim 7, wherein the valve rotation limitation element comprises a bracket.

9. The lockout device of claim 8, wherein the bracket comprises a handle receiving portion and a shackle receiving portion.

10. The lockout device of claim 8, wherein the lockout body comprises a metal construction.

11. The lockout device of claim 7, wherein the lockout body comprises a plurality of stabilizer legs extending from the shackle holder to the outer surface defining the opening the stabilizer legs strengthening the shackle holder to provide a stable surface for receiving a padlock.

12. The lockout device of claim 11, wherein the apertures in the shackle holder are centered between the stabilizer legs.

13. The lockout device of claim 11, wherein the shackle receiving cover comprises an I-shaped element, wherein the center portion comprises the shackle apertures and the outer portions are sized and dimensioned to be received over the stabilizer legs.

14. The lockout device of claim 11, wherein the shackle receiving cover comprises a C-shaped element, wherein the center portion comprises the shackle apertures and the outer portions are sized and dimensioned to be received over the stabilizer legs.

15. The lockout device of claim 11, wherein the stabilizer legs extend perpendicularly to opposing sides of the shackle holder.

16. The lockout device of claim 15, wherein the stabilizer legs extend perpendicularly from each of the opposing surfaces of the shackle holder.

17. The lockout device of claim 15, wherein the stabilizer legs extend from one surface of the shackle holder.

18. The lockout device of claim 7, wherein the shackle holder comprises a clip for coupling the cover in position.

19. The lockout device of claim 7, wherein the lockout body comprises a clamp aperture sized and dimensioned to receive a belt corresponding to a hose clamp.

20. The lockout device of claim 7, wherein the valve rotation limiting element is sized and dimensioned to receive a handle of a ball valve.

* * * * *